United States Patent
Akyol et al.

(10) Patent No.: US 8,136,162 B2
(45) Date of Patent: Mar. 13, 2012

(54) INTELLIGENT NETWORK INTERFACE CONTROLLER

(75) Inventors: Bora Akyol, San Jose, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1079 days.

(21) Appl. No.: 11/513,873

(22) Filed: Aug. 31, 2006

(65) Prior Publication Data

US 2008/0056487 A1    Mar. 6, 2008

(51) Int. Cl.
- G06F 11/30 (2006.01)
- G06F 12/14 (2006.01)
- G06F 12/16 (2006.01)
- G08B 23/00 (2006.01)

(52) U.S. Cl. ............... 726/24; 713/187; 713/188; 380/2
(58) Field of Classification Search ...... 380/2; 713/187, 713/188; 726/24
See application file for complete search history.

(56) References Cited

U.S. PATENT DOCUMENTS

| | | | | |
|---|---|---|---|---|
| 5,802,277 | A * | 9/1998 | Cowlard | 726/22 |
| 6,006,329 | A * | 12/1999 | Chi | 726/24 |
| 7,490,350 | B1 * | 2/2009 | Murotake et al. | 726/11 |
| 2002/0166067 | A1 * | 11/2002 | Pritchard et al. | 713/201 |
| 2002/0174358 | A1 * | 11/2002 | Wolff et al. | 713/200 |
| 2003/0021280 | A1 * | 1/2003 | Makinson et al. | 370/401 |
| 2003/0041136 | A1 * | 2/2003 | Cheline et al. | 709/223 |
| 2003/0110395 | A1 * | 6/2003 | Presotto et al. | 713/201 |
| 2003/0145228 | A1 * | 7/2003 | Suuronen et al. | 713/201 |
| 2004/0003284 | A1 * | 1/2004 | Campbell et al. | 713/201 |
| 2005/0076227 | A1 * | 4/2005 | Kang et al. | 713/188 |
| 2005/0086512 | A1 * | 4/2005 | Lee et al. | 713/200 |
| 2005/0114700 | A1 * | 5/2005 | Barrie et al. | 713/201 |
| 2005/0216759 | A1 * | 9/2005 | Rothman et al. | 713/200 |
| 2005/0276228 | A1 * | 12/2005 | Yavatkar et al. | 370/242 |
| 2006/0064755 | A1 * | 3/2006 | Azadet et al. | 726/24 |
| 2006/0161984 | A1 * | 7/2006 | Phillips et al. | 726/24 |
| 2006/0242686 | A1 * | 10/2006 | Toda et al. | 726/3 |
| 2006/0265486 | A1 * | 11/2006 | Killian et al. | 709/223 |
| 2007/0055803 | A1 * | 3/2007 | Fuchs et al. | 710/107 |
| 2008/0010683 | A1 * | 1/2008 | Baddour et al. | 726/24 |

FOREIGN PATENT DOCUMENTS

| | | |
|---|---|---|
| CN | 1350230 | 5/2002 |
| CN | 1375775 | 10/2002 |
| CN | 1965306 | 5/2007 |
| EP | 1564623 A1 * | 8/2005 |
| WO | 2005027539 A2 | 3/2005 |

OTHER PUBLICATIONS

Application Serial No. 200710148226.6, Office Action mailed Dec. 23, 2011, 7 pages.

* cited by examiner

Primary Examiner — Michael Simitoski
(74) Attorney, Agent, or Firm — Brake Hughes Bellermann LLP

(57) ABSTRACT

A network interface device includes a security database and a security services engine. The security database is configured to store patterns corresponding to predetermined malware. The security services engine is configured to compare data to be transmitted through a network to the patterns stored in the security database, and the security database is configured to receive updated patterns from the network.

20 Claims, 4 Drawing Sheets

INTELLIGENT NETWORK INTERFACE CONTROLLER

TECHNICAL FIELD

This description relates to communication between computing systems and networks and, in particular, to an intelligent network interface controller.

BACKGROUND

Networked computer systems typically include a plurality of client computers linked together in a network through which large amounts of data can be exchanged. A group of computers connected in a network in a central location can be referred to as a local area network (LAN), and a group of widely-separated computers or LANs can be connected together in a wide area network (WAN), such as, for example, the Internet.

Clients can communicate with each other by packaging data into packets that are exchanged through the network with other clients. Packets typically include a payload that contains the data to be transmitted over the network and a header that describes the location of the destination to which the packet should be sent. Each client can be assigned a unique address in a network, which can be used to uniquely identify the client to the network and to other devices in the network. The unique address can be, for example, an Internet protocol (IP) address or a media access control (MAC) address. As packets are transmitted through the network from an origination client to a destination client, the packets may pass though a number of network nodes (e.g., hubs, routers, switches, and network servers) that receive the packets and route the packets to the destination or to other nodes along the way to the destination.

Although networked computer systems provide many advantages because of the interconnectivity between multiple clients, such interconnectivity can lead to vulnerabilities and harm to the interconnected clients of the network. For example, in an ideal network, data are transmitted securely from an origination client to a destination client. However, unauthorized users may break into the network—either at a network node or at connections between nodes—and copy and/or infect the data transferred over the network, which can lead to the theft of confidential data or the spread of infected data through the network. Additionally, malicious data (e.g., viruses and worms) contained on an origination client may be easily transmitted from the client through the network to one or more destination clients, where the malicious data can cause harm to the destination client(s).

To combat unauthorized access to, and the theft of, confidential data transmitted through the network, the data may be encrypted at the origination client prior to transmission and decrypted by the destination client upon receipt. However, in such a scenario the network is essentially blind to the contents of the data and therefore can be vulnerable to the spread of malicious data (e.g., viruses) that it cannot recognize as malicious. Useful analysis of network traffic (e.g. for the detection and prevention of malicious data) generally can be performed only on clear, unencrypted data or only after the network traffic has been decrypted at a network node or destination site, but decrypting the traffic while it is in route from an origination client to a destination client would largely defeat the purpose of using encrypted data to communicate between the origin and the destination.

To combat the spread of malicious data, data transmitted through the network can be scanned for viruses, worms, and other malicious data. The data can be scanned by anti-virus and anti-malware programs residing on the client before the data is transmitted from the client to the network or immediately upon receipt of the data from the network. Unfortunately, the first act of a malicious program loaded into a computer system often is to disable such anti-virus and anti-malware programs, so that malicious programs and data will not be detected by the client and can be spread to other clients connected to the network. Data transmitted through the network also can be scanned by anti-virus and anti-malware programs residing on a network node, however, the operation of such programs generally depends on access to clear, unencrypted data, and therefore such programs generally are incapable of detecting encrypted, malicious data. Moreover, requiring the network to scan transmitted data packets for malicious data can place a heavy burden on the network when the network is connected to multiple clients.

SUMMARY

In a first general aspect, a network interface device includes a security database and a security services engine. The security database is configured to store patterns corresponding to predetermined malware. The security services engine is configured to compare data to be transmitted through a network to the patterns stored in the security database, and the security database is configured to receive updated patterns from the network.

Implementations can include one or more of the following features. For example, the network interface device can be configured to receive the updated patterns from the network through an encrypted channel. The security services engine can include at least one of: an intrusion detection service, an intrusion prevention service, or an anti-virus scanning service. The network interface device can further include a hardware-based identification token for identifying the network interface device to the network. The network interface device also can include a host bus configured to receive the data to be transmitted through the network from a central processing unit of the system and/or an encryption engine configured to encrypt the data after comparison to the patterns. The security services engine can be configured to scan the data independently of instructions received from a central processing unit of the system. The security database can be configured to be inaccessible to a central processing unit of the system. The patterns can include signatures or regular expressions of malware code.

In another general aspect, a computing system includes a central processing unit (CPU), a random access memory accessible to the CPU and configured to store instructions that are executable by the CPU, and a network interface device configured to route data between the central processing unit and a network. The network interface device includes a security database and a security services engine. The security database is configured to store patterns corresponding to predetermined malware. The security services engine is configured to compare data to be transmitted through a network to the patterns stored in the security database, and the security database is configured to receive updated patterns from the network.

Implementations can include one or more of the following features. For example, the computing system can further include a hardware-based identification token for identifying the network interface device to the network. The computing system can further include a host bus configured to exchange the data between the network interface device and the central processing unit of the system. The network interface device can further include an encryption engine configured to encrypt the data after comparison to the patterns. The security services engine can be configured to compare the data to the patterns independently of instructions received from the central processing unit. The security database can be configured to be inaccessible to the central processing unit. The patterns can include signatures or regular expressions of malware code. The network interface device can further include a quarantine engine configured to quarantine the computing system from the network when a comparison of the data to the patterns reveals a match. The network interface device can be further configured to establish a secure channel to a network management station based on the transmission of a hardware-based identification token from the network interface device to the network management station, and the secure channel can be further configured to route the updates from the network to the security database. The network interface device can further include an encryption engine configured to encrypt the data after comparison to the patterns.

In another general aspect, a method can include transmitting data from a central processing unit of a computing system to a network interface device for transmission from the network interface device to a network and comparing the data to patterns corresponding to predetermined malware pattern, where the patterns are stored in a security database within the network interface device that is inaccessible the central processing unit.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
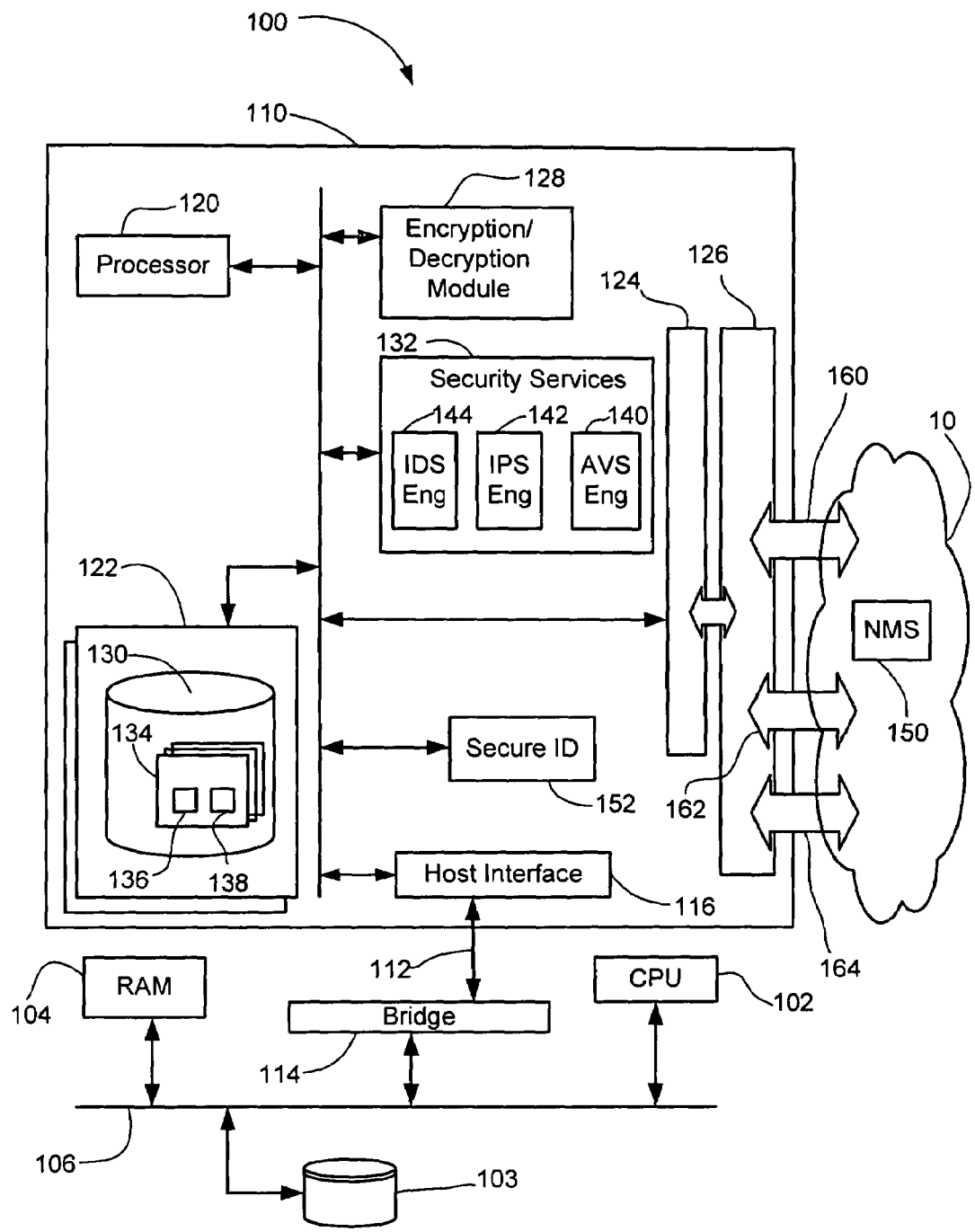
FIG. 1 is a schematic block diagram of a computing system that is configured for communicating with a network.

FIG. 1 is a schematic block diagram of a computing system 100 that is configured for communicating with a network 10. The computing system 100 can be, for example, a personal computer, a server computer, a personal digital assistant (PDA), a mobile phone, a smart phone, or any other kind of computing device capable of being linked to another computing device though a network. The computer system can include a processor (e.g., a central processing unit (CPU)) 102, a fixed storage device (e.g., a hard disk, non-volatile (e.g., Flash) memory, or removable, recordable media (e.g., a CD)) 103, and a random access memory (RAM) 104 that are coupled together, and that can exchange information, over a bus 106 (e.g., a Peripheral Component Interconnect (PCI) bus or other such computer expansion bus). The storage device 103 can be a non-volatile memory device capable of storing computer-readable instructions (e.g., software) that can be transferred to the RAM 104 for execution by the CPU 102. For example, the storage device 103 can store an operating system and/or one or more application programs that can be executed by the CPU 102 of the computing system 100. The network 10 can be, for example, a LAN, a WAN, the Internet, or an intranet. The network 10 can be coupled to the system 100, for example, though physical media (e.g., copper wires) upon which electrical signals propagate, through fiber optic cables (e.g., glass fibers) through which optical signals propagate, though wireless communication channels though which electromagnetic signals propagate, or through some combination of various communication channels.

The computing system 100 also includes a network interface device (NID) 110 that is configured to couple the computing system 100 to the network (e.g., a packet switched network) 10. The NID (110) can include protocol processing modules that enable the system 100 to exchange data with the computer network 10. To accommodate the transfer of data packets needed to support these applications, transmission control protocols (TCP) and other related techniques are used to properly format the data packets. This formatting facilitates the reception of these packets by remote-end equipment connected to the computing system 100 through the network 10. In one example, the TCP Internet Protocol (TCP/IP) suite of protocols is used in computer networks, such as the Internet, to format data packets for transmission. These protocols, which can be added to data packets prior to transmission, typically can be processed within the computing system 100 by a software module known as a networking protocol stack (e.g., a host TCP stack).

The NID 110 can be coupled to the CPU 102 and the memory 104 through a host bus adaptor 116, a host bus 112, and a bridge 114. The NID 110 may be a stand-alone component, e.g., a card that plugs into an expansion slot within the computing system 100, or the NID can be integrated into another component of the computing system 100. For example, the NID 110 can be integrated within the motherboard of the computing system.

The NID 110 can include one or more processors 120 and one or more memory devices 122, which may be part of an application specific integrated circuit (ASIC) within the NID. The processors 120 can perform operations on data within the NID, for example, related to preparing packets for transmission to the network, receiving packets from the network, and to the security of the network 10 and the system 100, as explained in more detail below. The one or more memory devices 122 can include read only memory (ROM) and random access memory (RAM) for storing instructions that can be executed, referenced, or otherwise used by the one or more processors 120.

The NID 110 can include components related to media access control (MAC) layer circuitry 124 and physical layer interface (PHY) circuitry 126 through which packets pass when they are transmitted from the NID 110 to the network 10 or when they are received by the NID from the network. The MAC layer 124 is a logical layer within the OSI network model data link layer that controls access to the PHY layer circuitry 126 of the NID 110.

For clients connected to the network to communicate, the clients must be able to identify each other. Thus, in one implementation, every NID 110 connected to the network may have a unique serial number (e.g., a 48-bit number), sometimes known as a MAC address, which can be used to uniquely identify the NID 110 to the network 10 and to other clients connected to the network. Thus, in such an implementation, when the system 100 transmits information to another destination client connected to the network, the information can be routed to the MAC address of the destination client to ensure that the information is properly delivered. The MAC address of a NID 110 can be stored in a ROM that can be, for example, on of the memories 122 contained within the NID 110, and unique MAC addresses can be assigned to NID's (e.g., by a standards body, such as the IEEE), such that two different NIDs never share the same MAC address. In another implementation, sometimes know as "promiscuous mode" communication, every data packet transmitted is received, read, and processed by the NID 110, regardless of whether the packet was specifically addressed to the NID. In non-promiscuous mode, when the NID 110 receives a packet, it checks the MAC address in it to verify that the packet was addressed to the NID 110, and if it was not, then the packet is dropped. When operating in promiscuous mode, the NID 110 does not drop the packet, even if the packet was not addressed to the MAC address assigned to the NID, thereby enabling the NID to read all packets it receives from the network.

The PHY layer 126 defines the electrical and physical specifications for the NID 110 (e.g., the layout of pins, voltages, and cable specifications). During operation, the PHY layer circuitry 126 establishes and terminates a connection between the system 100 and the network 10. The MAC layer circuitry 124 determines and controls which clients connected to the network 10 are allowed to communicate with the PHY layer 126 of the NID 110 at a particular time. The MAC layer circuitry 124 also converts data packets to network frames.

The NID 110 can include an encryption/decryption module 128 for encrypting data traffic to be transmitted from the system 100 to the network 10 and for decrypting data traffic received by the system from the network. Thus, the NID 110 may be configured to receive unencrypted data over the host bus 112 from the CPU 102 and then may encrypt the data in the encryption/decryption module 128 prior to outputting the data from the system to the network. When the system 100 functions as a destination client, encrypted data may be received from the network 10 and decrypted in the encryption/decryption module 128 prior to routing the clear data to the CPU 102. The encryption/decryption module 128 may establish a secure connection (e.g., a secure socket layer (SSL) connection or an IP Security (IPSEC) connection) between the system and another network client by negotiating and agreeing upon a cryptographic algorithm to use for communication of data between the system 100 and the other client. Such cryptographic algorithms can be based on, for example, public-key cryptography, symmetric cipher, and one-way hash functions. Once the secure connection is established data can be packetized and exchanged between the system 100 and the other client.

Figure 2:
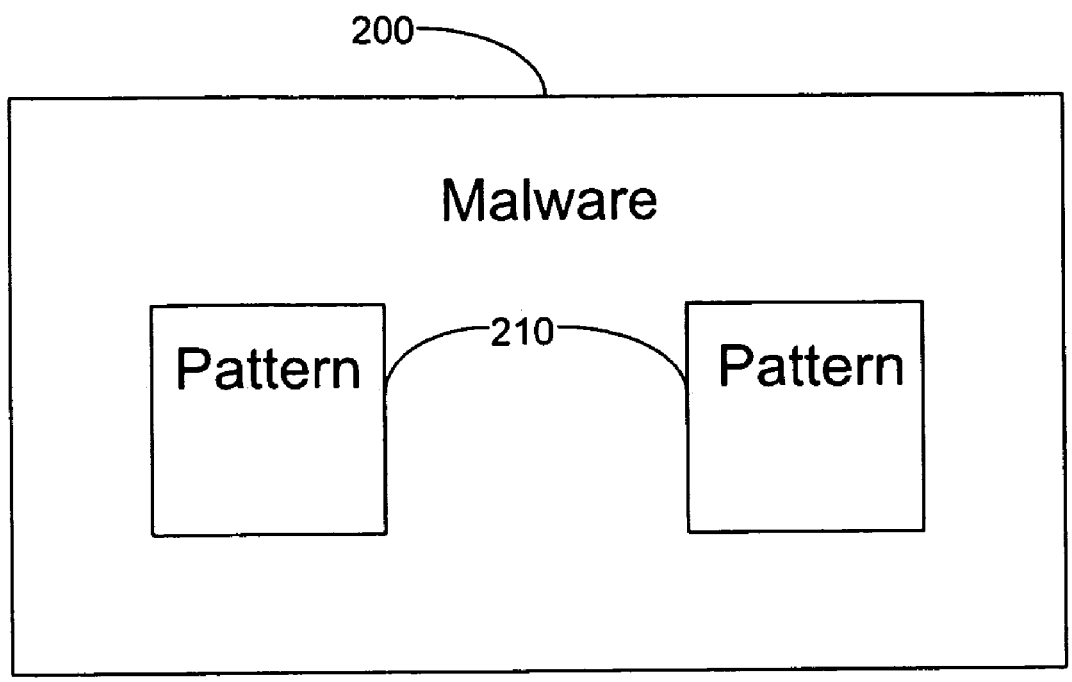
FIG. 2 is a block diagram of malicious software (malware).

In one implementation, the NID 110 can include a security database 130 and a suite 132 of security services that can be used together to scan incoming and outgoing packets for viruses, worms, and other types of malicious software ("malware") as well as to detect and prevent unauthorized intrusions into the network 10 or the system 100. The security database 130 can be stored in memory 122 and may store data corresponding to patterns 134 that characterize particular malware 200. Malware 200, shown in FIG. 2, may include software, scripts, executable code, and data (e.g., such as computer viruses, worms, Trojan horses, spyware, or adware) designed to infiltrate and damage the computer system 100 or the network 10. For example, the objective of malware 200 may be to cause one or more events to occur in the system 100 or network 10 that have adverse performance or security consequences for a user of the system or network. Additionally, malware 200 may operate to exploit vulnerability in the system 100 or network 10 to violate a system or network security policy, which may have adverse consequences for a user of the system or network. After a particular piece of malware has been discovered, patterns that include chunks of code or strings of bits 210 within the malware can serve as fingerprints to identify the malware 200.

Referring again to FIG. 1, the suite 132 of security services can include an anti-virus scanning (AVS) engine 140, an intrusion protection service (IPS) engine 142, and an intrusion detection service (IDS) engine 144 that can perform various security services on data traffic exchanged, or to be exchanged, between the system 100 and the network 10. The various engines 140, 142, and 144 can be engines executed by the processor 120 based on code stored in the memory device 122 and which rely on information stored in the database 130 to perform their service(s).

In one example, the AVS engine 140 can make use of a dictionary of patterns 134 stored in the security database 130 to detect, isolate, and quarantine known malware, such as viruses, worms, Trojan horses, spyware, or adware. When the AVS 140 examines a data traffic passing through the NID 110 (e.g., data traffic that forms part of a file that sent to or received from the network 10) the AVS may compare the data traffic to the patterns 134 of known viruses that have been identified by authors of the AVS. If a piece of code in the data traffic matches a pattern 134 in the database 130, the AVS can attempt to repair the file of which the data traffic forms a part by removing the virus from the file before passing the file over the host bus 112 to the CPU 102 of the system 100. Alternatively or additionally, the AVS 140 can invoke a quarantine engine 150 that may tag the file as infected before passing the file to the CPU 102 of the system. Then, based on the quarantine tag, the CPU 102 can route the file immediately to an isolated portion of the storage device 103 or the RAM 104, such that the infected file cannot be accessed by other programs that loaded into RAM 104 and executed by the CPU 102. Thus, the spread of the virus to other clients connected to the network can be halted or prevented. Alternatively, when the AVS engine 140 recognizes a match between a pattern 134 in the security database 130 and a piece of code in data traffic passing through the NID 110, the AVS engine may simply delete the file of which the piece of code is a part so that the file is not passed to the CPU of the system 100.

The patterns 134 in the security database 130 can include signatures 136 and regular expressions 138 used to identify known or suspected malware. Signatures 134 may include distinctive byte-patterns that characterize malware or families of malware and that can be identified by the AVS engine 140 when the malware passes through the NID 110. When such a byte-pattern in data traffic passing through the NID 110 is recognized by the AVS engine 140, the AVS engine can take action to protect the system 100 and the network from the malware. Some viruses employ techniques that may prevent detection by finding exact matches between a signature and a byte-pattern in the virus. For example, a virus may contain a similar but non-identical byte-pattern to a signature 136 that is stored in the database 130 or a virus may automatically modify portions of its code such that it does not always have the same signature. In such a case, regular expressions 138 stored in the database 130 may be used to describe loosely the virus, such that the virus nonetheless can be distinguished from other network traffic. Thus, instead of uniquely identifying a particular byte-pattern, a regular expression 138 can describe a set of similar or related byte-patterns that characterize malware to be detected by the AVS 140, but all the elements of the set need not be listed in the database 130.

Regular expressions can be expressed in terms of formal language theory and can include constants and operators that describe sets of strings and operations over these sets, respectively. Thus, for example, the set containing the three strings Schaefer, Schäfer, and Schafer can be described by the pattern "Sch(ä|ae?)fer," where the "|" operator indicates that the characters "ä" and "a" that appear before and after the operator are valid possibilities and the ? operator indicates that the character that appears before the operator may be included or omitted and where parentheses indicate the constants over which the operators operate.

Thus, a regular expression 138 typically describes more potential data sets than a signature 136 describes, but the regular expression may result in more false positive matches than a signature does. Therefore, the looser definitions of malware offered by the use of regular expressions 138 may identify more malware than when using exact signatures, especially if a known piece of malware can exist in a number of different variations or strains, or if the malware has the capability of automatically modifying itself (e.g., to escape detection though a match to a signature).

In addition to detecting malware though comparison of the data traffic to signatures and regular expressions stored in a database, malware can also be detected through other techniques and methods. For example, the security services 132 can include routines, which may be included in any or all of the IDS engine 144, the IPS engine 142, and the AVS engine 140, that monitor and analyze network behavior to detect anomalies in the traffic patterns indicative of malware. The detection of an anomaly in the network traffic passing through the NID 110 can indicate the presence of malware in the computing system 100. For example, in one implementation, the rate at while data traffic passes through the NID 110 can be monitored, and an anomalously high data traffic rate for a sufficient period of time may indicate that a denial-of-service ("DOS") attack is being waged against the system 100. In another implementation, interactions between individual or groups of hosts connected in a network can be monitored for anomalies. Thus, a normally quiet host that suddenly increases its activity by a large amount (e.g., begins connecting to hundreds of other hosts per second) may indicate that the normally quiet host is spreading a worm to the other hosts.

Patterns of network traffic can be stored in the database 130 and used to provide a comparison with real-time network traffic to determine the real-time traffic is anomalous, such that malware is detected. The stored patterns can be indicative of normal, non-anomalous traffic or of anomalous traffic. The patterns can be generated by monitoring traffic though the NID 110 during a time period that is pre-determined to be non-anomalous, and various algorithms can be used to determine whether traffic is anomalous or not. For example, such algorithms may consider how, in normal operation, data traffic through the NID 110 depends on such factors as when the system 100 is started, how many applications are running on the system 100, how many users are using the system 100, the time of day, and how many other external systems the system 100 is connected to. The non-anomalous pattern traffic through the NID 110 may depend on these and other factors, and therefore variations in these factors should not trigger false positive alarms of malware.

In some implementations, the security database 130 may be configured, such that it is inaccessible to the CPU 102 of the system 100. That is, the host interface 116 may prohibit instructions, addresses, and/or data received over the host bus 112 from being written to the security database in the NID 110. Therefore, if the virus or other malware is loaded into the storage device 103, the RAM 104, or the CPU 102 of the system 100, it will be impossible for the virus or malware to gain access to the security database 130 to corrupt or modify the patterns 134 in the database and thereby compromise the functionality of the engines in the security services suite 132. In addition, scanning data traffic received by the NID 110 from the network may be performed by engines in the suite 132 of security services independently from instructions from the CPU 102 of the system 100, which further protects the BIOS, operating system, and application programs stored in the RAM 104 and/or on the storage device 103 from becoming infected and disabled.

The IDS engine 144 may be configured to detect the presence or activity of undesirable or unauthorized modifications to the computing system 100 (e.g., denial of service attacks, scripts designed to compromise the security of the system). The IDS engine 144 can monitor data traffic though the NID 110 and compare the data traffic data patterns or application data that are known to be malicious. Signatures 136 and regular expressions 138 of such data traffic patterns and application data can be stored in the security database 130 for comparison to the incoming or outgoing network traffic. Thus, the IDS engine 144 may determine that malware 200 is present or seeks access to the computing system 100 when data in one or more packets in the NID 110 matches a pattern 134 in the security database 130.

The IPS engine 142 may be configured to control access from the network 10 to the computing system 100 to prevent exploitation of the system by unauthorized undesirable code received from at the system from the network. The IPS engine 142 may be in communication with the IDS engine 144, such that the IPS engine can be altered when an attempted intrusion has been detected by the IDS engine. Upon notification that a possible intrusion event has been detected (e.g., based on the detection of a match between a data traffic over the NID 110 and a pattern 134 in the security database 130), the IPS engine 144 may operate to prevent the network 10 and the computing system 100 from communicating with each other. For example, the IPS engine may operate to reject additional packets from an IP address or a MAC address that is identical or related to the IP or MAC address in the header of the packets that contain the malware that is detected by the IDS engine 144.

On the other hand, if malware is loaded from the CPU 102 over the host bus 112 into the NID 110 for transmission to the network, the malware may be detected by the AVS engine 140 or the IDS engine 144 prior to transmission. Once the malware has been detected the IPS engine 142 can immediately send a message to the network 10 to alert the network that the system has become infected or subject of an intrusion attempt and that corrective action is required. Subsequently, the IPS engine 144 may block any further attempted transmission of packets from the system 100 to prevent the system from harming the network. After corrective action has been taken to remove or neutralize the malware, the NID 110 can be reset to re-allow transmission of data from the system 100 to the network. Thus, the IPS engine 142 of the NID 300 may prevent malware from spreading from the system 100 to the network 10 and to other network clients by quarantining the computing system 100 from the network.

The NID 110 can communicate with the network 10 through various communication channels, for example, a secure channel 160, an encrypted channel 162, and an unencrypted channel 164. The secure channel 160 can include a secure connection to route packets of information between the computing system 100 and one or more particular nodes in the network 10 and may be configured to prevent access by any entity other than the computing system 100 or one of the particular nodes in the network 10. For example, the secure channel 160 can be established between the system 100 and a network management station (NMS) 150 at a node in the network 10, where the NMS communicates with the system 100 to support the security services 132 that run on the NID 110, as explained herein.

The secure channel 160 can be established through a key exchange between the system 110 and the NMS 150. The system's root key can be stored, for example, in a ROM 152 that contains a unique identification token to uniquely identify the NID 110. The identification token can be burned into the semiconductor material of the NID when the NID is manufactured, and such a hardware-based key can be more secure than a software-based key.

Once a secure connection 160 between the system 100 and the NMS 150 is established, the NID 110 can receive updates to its security database 130 directly from the NMS. Thus, the signatures 136 and regular expressions 138 in the security database used to identify malware can be updated with information that does not need to pass through the CPU 102 or the RAM 104 of the system. The NID 110 can also receive updated algorithms from the NMS 150 for determining whether network traffic is anomalous or not.

In addition to the secure channel between the system 100 and the NMS 150, an encrypted channel 162 can be established between the system and other clients connected to the network 10. For example, the encrypted channel 162 can be a SSL or IPSEC connection as described above. The unencrypted channel 164 can be configured to route clear, unencrypted packets of information between the computing system 100 and the network 10.

Figure 3:
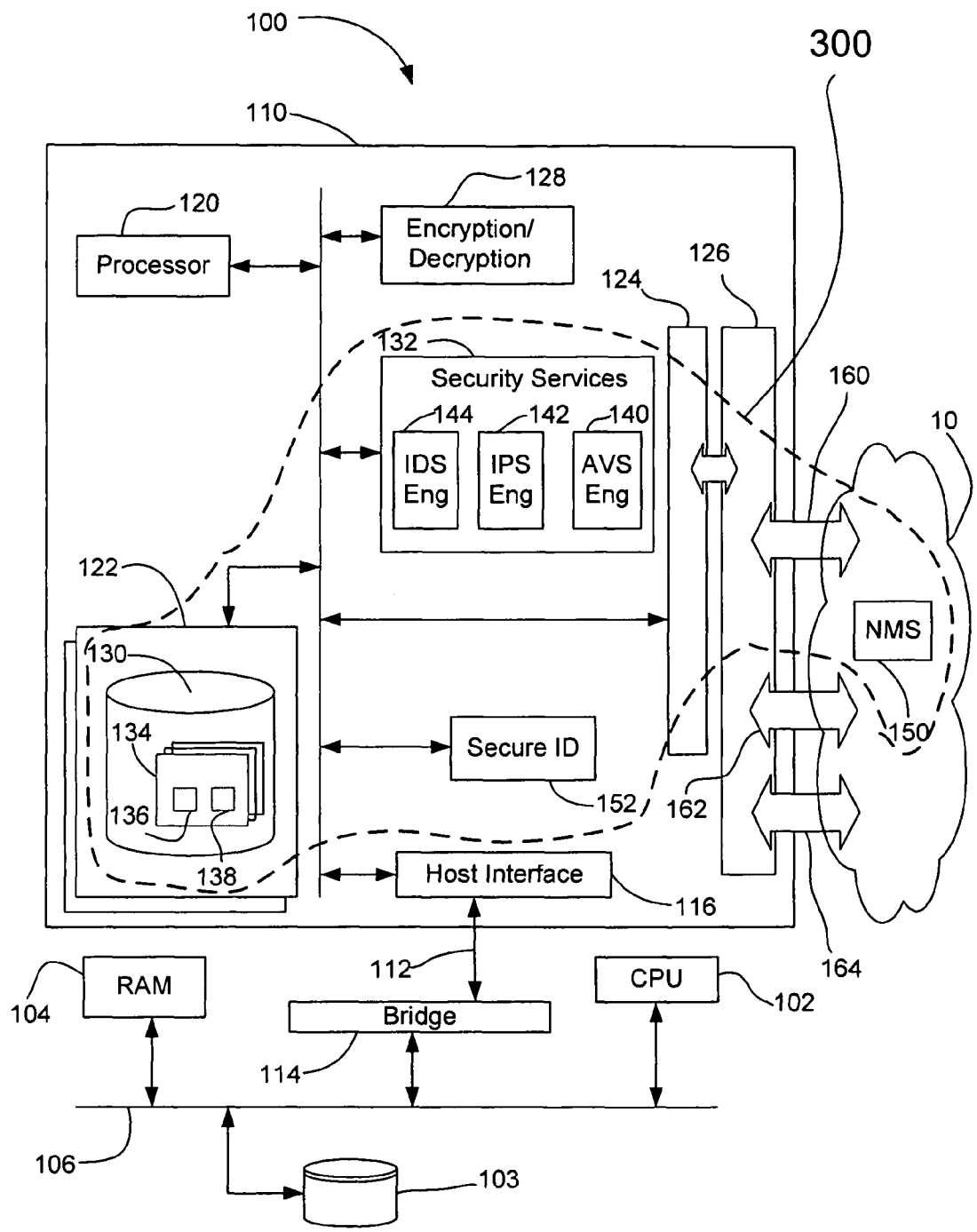
FIG. 3 is a schematic block diagram of a computing system that is configured for communicating with a network.

Thus, as shown in FIG. 3, a portion 300 of the networked system of the system 100 and the network 10 is controlled by the one or more NMS's 150 on the network but is generally inaccessible to the CPU 102 of the system. For example, the signature and regular expression data in the security database 132 is updated directly by the components of the network 10 with information that does not have to pass through the CPU of the system. Thus, the security database is largely immune to attack from malware that may infect the system though contact with the CPU 102. In addition, by distributing the process of scanning data traffic for malware to network clients such a system 100, network nodes are not in danger of becoming bottlenecks in data transmission due to having to scan large volumes of data. Thus, a scalable solution is achieved. Furthermore, the NID 110 can use one or more of the security service engines 140, 142, and 144 to scan clear, unencrypted data received over the host bust 112 from the CPU 102 of the system 100 and then can encrypt the data prior to transmission to the network 10. Thus, an end-to-end encrypted channel can be established between the system 100 and another network client, but scanning for malware can be performed on clear, unencrypted data, using a security database that is largely immune to intrusion and corruption.

Figure 4:
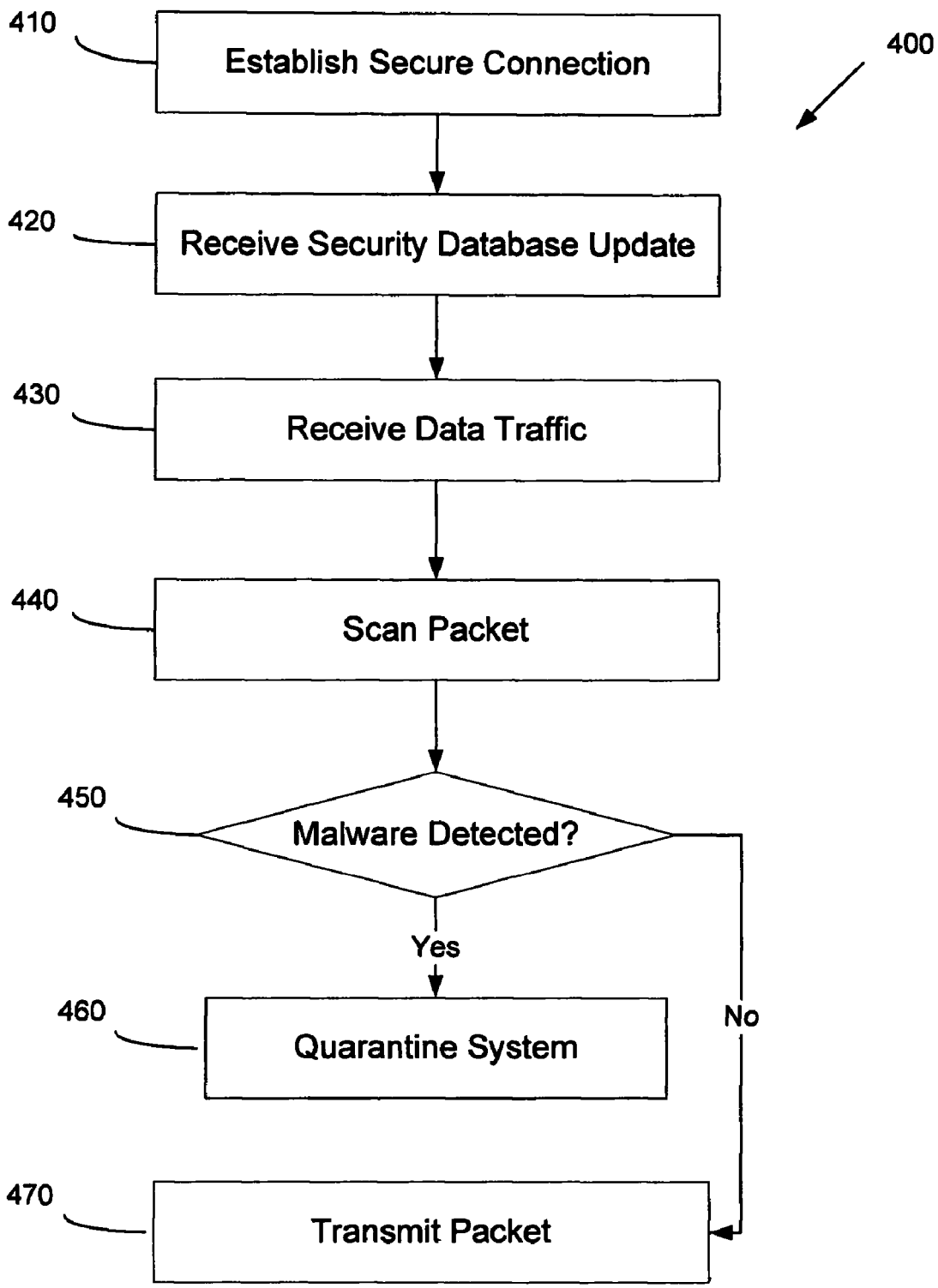
FIG. 4 is a flow chart of a process for preventing intrusion of a network.

FIG. 4 is a flow chart of an exemplary process 400 for preventing intrusion of a network. A secure connection can be established between a network client and node of the network (step 410), where the client includes a network interface device. Such a connection may be established automatically whenever the system is booted or whenever the network interface device established a connection to the network. Once the secure connection has been established, one or more updates to a security database stored in the network interface device and inaccessible to a CPU of the client can be received from the network node and loaded into the security database (step 420). The update may contain one or more signatures and/or regular expressions that correspond to a pattern of known or suspected malware.

Data traffic can be received at the network interface device from the CPU of the system (step 430), and the data traffic can be scanned for malware by the network interface device (step 440) by comparing the data traffic to at least one pattern stored in the security database. If malware is detected (decision 450), the system can be quarantined from the network (step 460), and if malware is not detected the data traffic can be transmitted from the system to the network.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A network interface device comprising:
a security database configured to:
store regular expressions characterizing predetermined malware; and
update the regular expressions based on updates received, via network circuitry, from a station in a network outside the network interface device;
a security services engine configured to compare, to the regular expressions stored in the security database, data to be transmitted from a host interface, through the network interface device, to the network;

the network circuitry configured to transmit and receive packets, including the data and the updates, to and from the network; and the host interface configured to couple the network interface device to a host bus outside the network interface device, the host interface being configured to prohibit data received via the host bus from being written to the security database.

2. The network interface device of claim 1, wherein the network interface device is configured to receive updated regular expressions from the network through the network circuitry via an encrypted channel.

3. The network interface device of claim 1, wherein the security services engine comprises at least one of:
an intrusion detection service,
an intrusion prevention service, or
an anti-virus scanning service.

4. The network interface device of claim 1, further comprising a hardware-based identification token for identifying the network interface device to the network.

5. The network interface device of claim 1, further comprising an encryption engine configured to encrypt the data after comparison to the regular expressions.

6. The network interface device of claim 1, wherein the security services engine is configured to scan the data independently of instructions received from a central processing unit (CPU) of a system which comprises the network interface device, the CPU being coupled to the network interface device via the host bus and the host interface.

7. The network interface device of claim 1, wherein the host interface is configured to make the security database inaccessible to a central processing unit of a system which comprises the network interface device.

8. The network interface device of claim 1, wherein:
each regular expression describes a set of related byte-patterns that characterize the predetermined malware.

9. The network interface device of claim 1, wherein the host interface is configured to:
couple the network interface device to the host bus;
transmit data from the host bus to the network, and to the host bus from the network, via the security services engine and the network circuitry; and
prohibit data received via the host bus from being written to the security database.

10. A computing system comprising:
a host comprising:
a central processing unit (CPU); and
a random access memory (RAM) accessible to the CPU and configured to store instructions that are executable by the CPU; and
a network interface device coupled to the host via a host bus and configured to route data between the CPU and a network, wherein the network interface device comprises:
a security database configured to:
store patterns corresponding to predetermined malware; and
update the stored patterns based on updated patterns received from a network management station via network circuitry;
a security services engine configured to compare data to be exchanged between the network and the host to the patterns stored in the security database; and the network circuitry configured to route the data between the host and the network and transmit the updated patterns from the network management station to the security database;
wherein:
the network interface device is further configured to establish a secure channel to the network management station via the network circuitry based on the transmission of a hardware-based identification token from the network interface device to the network management station,
the secure channel is further configured to route the updates from the network management station to the security database via the network circuitry, and
the network interface device is configured to prohibit data received from the host via the host bus from being written to the security database.

11. The computing system of claim 10, wherein the network interface device further comprises a hardware-based identification token for identifying the network interface device to the network management station.

12. The computing system of claim 10, further comprising the host bus configured to:
exchange the data between the network interface device and the CPU of the system; and
prohibit data received from the CPU or the random access memory from being written to the security database.

13. The computing system of claim 10, wherein the network interface device further comprises an encryption engine configured to encrypt the data after comparison to the patterns.

14. The computing system of claim 10, wherein the security services engine is configured to compare the data to the patterns independently of instructions received from the CPU.

15. The computing system of claim 10, wherein the security database is configured to be inaccessible to the CPU.

16. The computing system of claim 10, wherein the patterns comprise signatures or regular expressions of malware code.

17. The computing system of claim 10, wherein the network interface device further comprises a quarantine engine configured to quarantine the computing system from the network when a comparison of the data to the patterns reveals a match.

18. The computing system of claim 10, wherein the patterns comprise regular expressions, the regular expressions each describing a set of related byte-patterns that characterize the predetermined malware patterns.

19. A method comprising:
receiving updated patterns at a network interface device of a computing system from a network management station via network circuitry;
storing the patterns in a security database within the network interface device, the patterns corresponding to predetermined malware patterns;
blocking data received via a host bus from being written to the security database;
receiving, via the host bus, data for transmission, via the network circuitry, from the network interface device to a network; and
comparing the data to the patterns.

20. The method of claim 19, wherein the patterns comprise regular expressions, the regular expressions each describing a set of related byte-patterns that characterize the predetermined malware patterns.

* * * * *